United States Patent [19]
Kawai et al.

[11] Patent Number: 5,653,796
[45] Date of Patent: Aug. 5, 1997

[54] ADMIXTURE FOR CEMENT

[75] Inventors: Masaru Kawai; Shuji Igarashi, both of Tokyo, Japan

[73] Assignee: Dipsol Chemicals Co., Ltd., Tokyo, Japan

[21] Appl. No.: 623,864

[22] Filed: Mar. 29, 1996

[30] Foreign Application Priority Data

Feb. 26, 1996 [JP] Japan .................................. 8-38385

[51] Int. Cl.$^6$ .................................................. C04B 22/16
[52] U.S. Cl. ..................... 106/717; 106/287.29; 106/819
[58] Field of Search ........................... 106/717, 819, 106/287.29

[56] References Cited

U.S. PATENT DOCUMENTS 3,625,286  12/1971  Parker ........................ 166/291
4,455,171  6/1984  Spensley et al. ................ 106/696

FOREIGN PATENT DOCUMENTS 1-176255  7/1989  Japan .
6-199555  7/1994  Japan .

*Primary Examiner*—Anthony Green
*Attorney, Agent, or Firm*—Oblon, Spivak, McClelland, Maier & Neustadt, P.C.

[57] ABSTRACT

An admixture for cement comprises phosphorous acid and/or a salt thereof or a waste fluid originated from an electroless nickel-plating process which contains phosphorous acid and/or a salt thereof. The admixture is used as a setting accelerator, a rust proofing agent for reinforcing steel or a frost resistive agent for concrete and mortar as hydraulic cement blends. The admixture not only permits improvement of the resulting concrete in the setting-accelerating effect, but also can maintain the compressive strength at a high level while maintaining the bleeding rate at a low level.

8 Claims, No Drawings

/ 1

ADMIXTURE FOR CEMENT

BACKGROUND OF THE INVENTION

The present invention relates to an admixture or additive for cement or ready-mixed cement and more specifically to an admixture effective as a setting accelerator, a rust proofing agent for reinforcing steel or a frost resistive agent for concrete and mortar as hydraulic cement blends.

As such a setting accelerator, there have in general been used a chlorine-containing compound, in particular, calcium chloride or chlorine-free compound in the form of a salt such as potassium thiocyanate or sodium carbonate. Moreover, nitrites as rust proofing agents for reinforcing steel and aliphatic aminoalcohols as frost resistive agents have been used as principal components for admixtures. In this connection, Japanese Un-Examined Patent Publication (hereinafter referred to as "J.P. KOKAI") No. Hei 1-17625 discloses amidosulfonic acid as an antifreezing agent or a hardening accelerator and J.P. KOKAI No. Hei 6-19955 discloses the use of an admixture composed of glycol which serves as a low temperature hardening accelerator.

However, the use of calcium chloride which has currently been employed as a setting accelerator or a frost resistive agent suffers from a problem such that the chlorine atoms present in the compound causes corrosion of steel materials embedded in concrete and that this leads to reduction in the strength and durability of the resulting concrete. For this reason, the use thereof has been regulated recently. In addition, the chlorine-free compounds such as potassium thiocyanate, sodium carbonate, sodium nitrite, formates and amidosulfonic acid, which have been used as substitutes for calcium chloride, exhibit reduced effect of corroding steel materials, but are inferior to calcium chloride in the degree of setting acceleration effect, strength achieved after hardening and price, while glycol does not have satisfactory effect when it is used alone. Therefore, there has been desired for further improvement of these additives.

On the other hand, the electroless nickel-plating technique has widely been used in various fields, in particular, in the electronic industries for plating, for instance, recording mediums. However, waste fluids generated during the processes have been disposed through ocean disposal or after chemical sewage treatments without effective reuse thereof except for a rare case wherein they are reused as chemical fertilizers.

In respect of treatments for the waste fluids originated from the electroless nickel-plating processes, however, the ocean disposal thereof has completely been prohibited because of the recent world-wide trend of terrestrial environmental protection. For this reason, there has been intensively desired for the development of an economical method for treating or reusing the waste fluids originated from the foregoing plating processes, which presently amount to not less than 20,000,000 l per year.

SUMMARY OF THE INVENTION

Accordingly, it is an object of the present invention to provide an admixture for cement effective as a setting accelerator, a rust proofing agent for reinforcing steel and/or a frost resistive agent.

Another object of the present invention is to provide a method for effectively reusing the waste fluids originated from the electroless nickel-plating processes.

A still another object of the present invention is to provide a method of using the foregoing admixture for cement in concrete or mortar as a setting accelerator, a rust proofing agent for reinforcing steel to be embedded therein and/or a frost resistive agent.

These and other object and features of the present invention will become apparent from the following detailed description.

The present invention has been completed on the basis of such a finding that the main component of the waste fluid generated during the electroless nickel-plating process is a phosphite and that the use of phosphorous acid and/or salts thereof permits the effective solution of the foregoing problems.

According to an aspect of the present invention, there is provided an admixture for cement which comprises phosphorous acid and/or salts thereof.

According to another aspect of the present invention, there is also provided an admixture for cement which consists of a waste fluid generated during an electroless nickel-plating process, which comprises phosphorous acid and/or salts thereof.

According to a further aspect of the present invention, there is provided a method for preparing concrete or mortar which comprises adding the foregoing admixture for cement to cement in an amount of not less than 3 parts by weight, as expressed in terms of the amount of the effective component thereof per 100 parts by weight of the cement.

DESCRIPTION OF THE PREFERRED EMBODIMENTS

In the present invention, phosphorous acid or a phosphite or a mixture thereof is used as an effective component of the admixture for cement. Examples of phosphites herein used are alkali metal salts such as sodium and potassium salts; alkaline earth metal salts such as calcium and magnesium salts; and amine salts such as ammonium, alkylamine and ethanolamine salts. Among these, preferred are alkali metal salts, with sodium salt being more preferred.

The admixture for cement of the present invention may consist essentially of phosphorous acid and/or salts thereof, but may alternatively comprise a waste fluid originated from an electroless nickel-plating process, a concentrate thereof or a purified product thereof. The waste fluid originated from the electroless nickel-plating process herein means a used plating fluid obtained after about 6 turns such as an aqueous solution containing about 50 to 450 g/l, preferably about 100 to 450 g/l, further preferably about 150 to 450 g/l, particularly preferably about 250 g/l of sodium phosphite. The sodium phosphite is a by-product formed during reduction of nickel with sodium hypophosphite. Accordingly, the waste fluid may in general comprise about 20 to 80 g/l of sodium hypophosphite and about 0 to 10 g/l of nickel in addition to sodium phosphite. Moreover, it is also possible to use a waste fluid originated from an electroless nickel-plating process having a high concentration of sodium phosphite, for instance, ranging from 450 to 1,750 g/l, which is prepared by converting sodium hypophosphite in the waste fluid into sodium phosphite through an oxidation treatment such as a treatment of the waste with hydrogen peroxide or ozone. Alternatively, the waste fluid may be purified to give a purified product which comprises sodium phosphite in an amount ranging from about 150 to 350 g/l and which is almost free of other components of the waste. The purified product may likewise be used in the present invention.

Furthermore, the admixture for cement according to the present invention may also comprise various additives conventionally used as the admixtures for concrete as listed in the following Table 1 in any rate, in addition to the foregoing components.

TABLE 1

Conventional Admixture for Concrete

| | |
|---|---|
| AE Agent | sodium ligninsulfonate triethanolamine sulfonate |
| Water-Reducing Admixtures | surfactant type admixtures, |
| AE Water-Reducing Admixtures | polysaccharide type, ligninsulfonate type and oxycarboxylate type admixtures |
| High Quality Water-Reducing Admixtures | condensed polycyclic aromatic sulfonate type, melamine resin sulfonate |
| High Quality AE Water-Reducing Admixtures | type, polycarboxylate type and aminosulfonate type admixtures |
| Accelerators | calcium chloride, triethanolamine, thiosulfates, thiocyanates, acrylic acid |
| Setting Retarders | magnesium silicofluoride, phosphates, borates, lactic acid, tartaric acid, citric acid |
| Quick Setting Admixtures | sodium aluminate, sodium silicate, triethanolamine |
| Rust-Proofing Agents | sodium nitrite, phosphates, stannous chloride |
| Foaming Agents | aluminum powder, magnesium powder, zinc powder |

The admixture for cement according to the present invention is preferably added to cement in an amount of not less than 3 parts by weight (for example 3 to 24% by weight), more preferably not less than 6 parts by weight and most preferably 6 to 24 parts by weight (as expressed in terms of the amount of the effective component(s), i.e., phosphorous acid and/or a salt thereof) per 100 parts by weight of cement. In this respect, if the admixture is added in an amount of not less than 24 parts by weight, a higher setting-acceleration effect can be accomplished, but the flow characteristics of the resulting concrete is sometimes adversely affected. On the other hand, the waste fluid originated from the electroless nickel-plating process is suitably added to cement in such an amount that the concentration of sodium phosphite present in the waste fluid falls within the range defined above.

More specifically, the admixture for cement of the present invention may be added to a mixture comprising 100 parts by weight of cement, 100 to 600 parts by weight of aggregates such as sand and ballast and 30 to 70 parts by weight of water, in an amount (as expressed in terms of the amount of the effective component thereof) of not less than 3 parts by weight (for example 3 to 24% by weight) and preferably 6 to 24 parts by weight to thus prepare concrete or mortar. The admixture for cement of the invention can thus accelerate the setting of the concrete or mortar, can impart rust proofing effect to steel materials and can impart frost resistivity to the concrete. In the present invention, various reinforcing materials such as glass fibers may be added to concrete or mortar in addition to the foregoing aggregates.

The admixture for cement of the present invention not only permits improvement of the resulting concrete in the setting-accelerating effect, but also can maintain the compressive strength of the concrete at a high level while maintaining the bleeding rate thereof at a low level. Moreover, the admixture permits the elimination of the problem such as the corrosion of steel materials embedded in concrete unlike the conventional setting accelerators. In addition, waste fluids generated during electroless nickel-plating processes are used as sources of the supply for the admixture of the present invention and therefore, the admixture permits a reduction in the production cost and is effective for preventing or reducing the pollution of rivers and ocean. The admixture for cement according to the present invention can be used in various fields. For instance, if the admixture is used as a frost resistive agent, it permits any freezing of concrete during setting, in particular, in the winter season during which the retardation of concrete-setting becomes a serious problem and thus permits the acceleration of concrete-setting.

The present invention will hereinafter be described in more detail with reference to the following Examples, but the present invention is not restricted to these specific Examples.

EXAMPLE 1

Sodium phosphite was added to a mixture prepared by compounding 300 kg of cement, 600 kg of sand, 900 kg of ballast and 150 kg of water in an amount of 3% (wt % on the basis of the weight of the cement), followed by preparation of a concrete specimen having a size of $\phi 10 \times 20$ cm according to JIS A-1138 and inspection of the specimen for physical properties by the following methods.

Evaluation of Physical Properties

The concrete specimen was inspected for the setting time and setting acceleration effect by the concrete-setting test specified in JIS A-6204.

Moreover, the bleeding rate of the concrete specimen was determined according to JIS A-1123, the compressive strength thereof was determined according to JIS A-1108 after 28 days and the slump thereof immediately after mixing up of the concrete was determined by the slump test specified in JIS A-1101. The results thus obtained are summarized in the following Table 2.

In this respect, the term "bleeding" means such a phenomenon that a part of water required for kneading concrete or the like is released from fresh concrete or fresh mortar and rises to the surface due to sedimentation or separation of solid materials. It has in general been believed that any corrosion of reinforcing steel and freezing of concrete can be inhibited if the quantity of the bleeding is maintained at a low level.

EXAMPLE 2

The same procedures used in Example 1 were repeated except that sodium phosphite was added in an amount of 6% to prepare concrete and the setting time and setting-acceleration effect of the resulting concrete were determined by the same methods used in Example 1. The results thus obtained are listed in Table 2.

EXAMPLE 3

The same procedures used in Example 1 were repeated except that sodium phosphite was added in an amount of 12% to prepare concrete and the setting time and setting-acceleration effect of the resulting concrete were determined by the same methods used in Example 1. The results thus obtained are listed in Table 2.

EXAMPLE 4

The same procedures used in Example 1 were repeated except that sodium phosphite was added in an amount of 24% to prepare concrete and the setting time and setting-acceleration effect of the resulting concrete were determined by the same methods used in Example 1. The results thus obtained are listed in Table 2.

EXAMPLE 5

The same procedures used in Example 1 were repeated except that a waste fluid originated from an electroless nickel-plating process was added in such an amount that the amount of sodium phosphite present in the waste fluid was equal to 6% (wt % on the basis of the weight of the cement) to prepare concrete and the setting time and setting-acceleration effect of the resulting concrete were determined by the same methods used in Example 1. In this respect, the waste fluid comprised water and therefore, the amount of water in the raw material was reduced so that the water content of the resulting concrete was equal to that observed for the concrete prepared in Example 1. The results thus obtained are listed in Table 2.

The waste fluid originated from the electroless nickel-plating process used in this Example comprised 48 g/l of sodium hypophosphite, 258.2 g/l of sodium phosphite, 20.2 g/l of organic acids, 51.4 g/l of sulfate ions, 5.2 g/l of nickel and the balance of water.

EXAMPLE 6

The same procedures used in Example 5 were repeated except that a waste fluid originated from an electroless nickel-plating process identical to that used in Example 5 was added in such an amount that the amount of sodium phosphite present in the waste fluid was equal to 12% (wt % on the basis of the weight of the cement) to prepare concrete and the setting time and setting-acceleration effect of the resulting concrete were determined by the same methods used in Example 1. The results thus obtained are listed in Table 2.

EXAMPLE 7

The same procedures used in Example 1 were repeated except that a waste fluid originated from an electroless nickel-plating process different from that used in Example 5 was added in such an amount that the amount of sodium phosphite present in the waste fluid was equal to 12% (wt % on the basis of the weight of the cement) to prepare concrete and the setting time and setting-acceleration effect of the resulting concrete were determined by the same methods used in Example 1. The results thus obtained are listed in Table 2.

The waste fluid originated from the electroless nickel-plating process used in this Example comprised 30 g/l of sodium hypophosphite, 132.4 g/l of sodium phosphite, 25.2 g/l of organic acids, 48.4 g/l of sulfate ions, 5.9 g/l of nickel and the balance of water.

EXAMPLE 8

The same procedures used in Example 1 were repeated except that 6% (wt % on the basis of the weight of the cement) of phosphorous acid was substituted for the sodium phosphite to prepare concrete and the setting time and setting-acceleration effect of the resulting concrete were determined by the same methods used in Example 1. The results thus obtained are listed in Table 2.

Comparative Example 1

The same procedures used in Example 1 were repeated except that 1% of calcium chloride was substituted for the sodium phosphite to prepare concrete and the setting time and setting-acceleration effect of the resulting concrete were determined by the same methods used in Example 1. The results thus obtained are listed in Table 2.

Comparative Example 2

The same procedures used in Example 1 were repeated except that 0.05% of triethanolamine was substituted for the sodium phosphite to prepare concrete and the setting time and setting-acceleration effect of the resulting concrete were determined by the same methods used in Example 1. The results thus obtained are listed in Table 2.

Comparative Example 3

The same procedures used in Example 1 were repeated except that 1% of sodium nitrite was substituted for the sodium phosphite to prepare concrete and the setting time and setting-acceleration effect of the resulting concrete were determined by the same methods used in Example 1. The results thus obtained are listed in Table 2.

Comparative Example 4

Concrete was prepared from raw materials without using any admixture for cement and the setting time and setting-acceleration effect of the resulting concrete were determined by the same methods used in Example 1. The results thus obtained are listed in Table 2.

TABLE 2

| Ex. No. | Compressive Strength (kgf/cm$^2$) | Slump (cm) | Rate of Bleeding | Setting Time (Hour-Minute) | |
|---|---|---|---|---|---|
| | | | | Initiation Of Setting | Completion of Setting |
| 1 | 312 | 18.5 | 1.4 | 6-40 | 8-20 |
| 2 | 316 | 18.3 | 0.4 | 5-06 | 6-19 |
| 3 | 426 | 16.9 | 0 | 3-14 | 4-08 |
| 4 | 453 | 9.8 | 0 | 2-45 | 3-51 |
| 5 | 334 | 17.9 | 0.4 | 5-11 | 6-27 |
| 6 | 379 | 17.1 | 0 | 3-27 | 4-18 |
| 7 | 383 | 17.2 | 0 | 3-12 | 4-10 |
| 8 | 314 | 18.0 | 0 | 4-54 | 6-03 |
| 1* | 316 | 18.3 | 5.4 | 6-46 | 8-17 |
| 2* | 358 | 18.1 | 5.0 | 7-13 | 8-54 |
| 3* | 255 | 17.6 | 5.8 | 7-03 | 8-43 |
| 4* | 266 | 18.3 | 6.2 | 6-55 | 8-37 |

*Comparative Example

What is claimed is:

1. A cement admixture consisting essentially of a waste fluid originated from an electroless nickel-plating process said waste fluid comprising an aqueous solution containing about 50 to 450 g/l of sodium phosphite.

2. The cement admixture of claim 1 wherein the waste fluid is an aqueous solution containing about 50 to 450 g/l of sodium phosphite and about 20 to 80 g/l of sodium hypophosphite.

3. The cement admixture of claim 1, wherein the aqueous solution contains about 50 to 250 g/l of sodium phosphite.

4. A method for preparing concrete or mortar comprising the step of adding a cement admixture consisting essentially of a waste fluid originated from an electroless nickel-plating process said waste fluid comprising an aqueous solution containing about 50 to 450 g/l of sodium phosphite, to cement in an amount of not less than 3 parts by weight, as expressed in terms of the amount of sodium phosphite per 100 parts by weight of the cement.

5. The method of claim 4 wherein the cement admixture is added to the cement in an amount ranging from 3 to 24 parts by weight as expressed in terms of the amount of sodium phosphite thereof per 100 parts by weight of the cement.

6. The method of claim 4 wherein the the waste fluid is an aqueous solution containing about 50 to 450 g/l of sodium phosphite and about 20 to 80 g/l of sodium hypophosphite.

7. The method of claim 4, wherein the aqueous solution contains about 50 to 250 g/l of sodium phosphite.

8. The method of claim 4, wherein the cement admixture is added to the cement in an amount ranging from 6 to 24 parts by weight per 100 parts by weight of the cement based on the amount of sodium phosphite.

* * * * *